Nov. 7, 1939.  J. WÖLZ  2,179,442
SIFTER OR CONVEYER DEVICE
Filed March 22, 1938
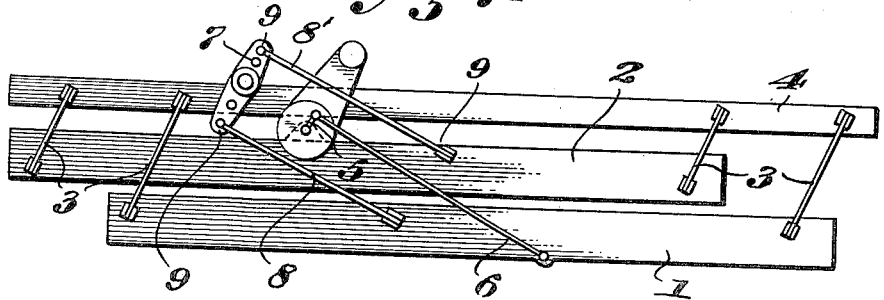
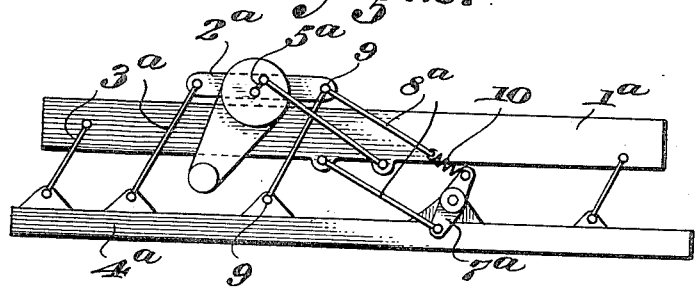
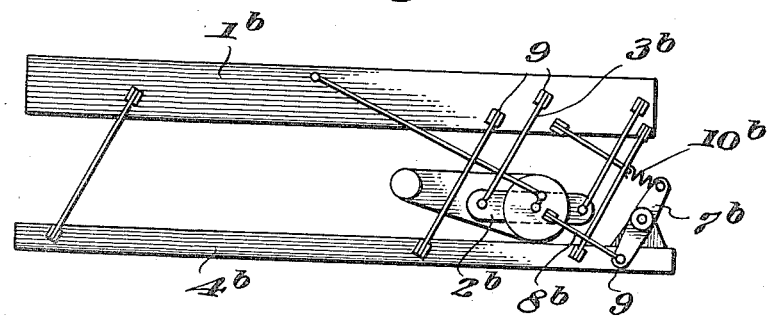
Inventor,
Josef Wölz
By Young, Emery & Thompson
attys.

Patented Nov. 7, 1939

2,179,442

UNITED STATES PATENT OFFICE 2,179,442

SIFTER OR CONVEYER DEVICE

Josef Wölz, Bochum, Germany, assignor to the firm Westfalia - Dinnendahl - Gröppel A.-G., Bochum, Germany Application March 22, 1938, Serial No. 197,522
In Germany June 2, 1937

5 Claims. (Cl. 74—26)

The invention relates to oscillatory devices used as sifters or conveyers comprising masses moving in opposite direction and suspended from or supported on a carrier frame by inclined leaf springs, links or the like, one of said masses being moved by a crankshaft mounted on this mass only and not on the frame of the sifter, the other mass being moved by a rod or the like operated by said shaft.

According to the present invention this arrangement is improved by use of a two armed lever mounted on the carrier frame substantially in parallel disposition to the suspending or supporting means of the masses, the ends of said lever being connected to the two masses respectively by means of members which are substantially perpendicular to the supporting or suspending means, the connection of said members being pivotal or yieldable at both ends to allow of swinging movement in relation to the masses.

This arrangement offers the advantage that the inertial components of the forces of the action of the two masses directed perpendicularly to the suspending or supporting means balance one another in the position of rest as well as during motion. This prevents inertial components from being introduced into the rods effecting the drive of the second mass. Thus, in these rods only accelerating or retarding forces arise. Other advantages consisting in reducing the power consumption of the plant and preventing the bending forces, which in the known arrangements arise from the aforesaid components of the masses, from acting upon the suspending or supporting means.

Another particular advantage of the invention consists in that by variation of the leverage ratio of the two armed lever the stroke ratio of the two masses may be varied in a simple manner. Such an arrangement is not possible in known drives, wherein the crankshaft is mounted in the frame. The variation of the stroke ratio may be of particular importance in starting up the plant, for the purpose of compensating on that occasion for circumstances which cannot be accurately taken into account during previous calculations and which affect the balance of the masses. In contrast, in other cases it is convenient to vary the stroke ratio for the purpose of obtaining the highest possible output, even if the balance of the masses is affected thereby.

In some cases it is advisable to connect elastically to the masses the members (e. g., rods) which lead from the two armed lever to said masses. The elastic means (e. g., springs) do not act, as in other known sifters, as loose couplings or power accumulators, the springs being of such size that they act yieldingly only when one mass (sifter) is heavily loaded and in such cases they completely balance the masses. Evidently in such a case a variation of the stroke ratio must be assumed.

Three embodiments of the invention are illustrated diagrammatically by way of example in side elevation in the accompanying drawing.

According to Fig. 1 the two masses 1 and 2 constructed for example as sifter frames, are suspended from the carrier frame 4 by means of inclined leaf springs 3. The mass 2 is driven by a crankshaft 5, which is mounted on this mass only and not on the carrier frame 4. From this crankshaft the mass 1 is driven by means of a separate rod 6 in the opposite direction to the movement given by the crank shaft to the mass 2.

Mounted on the frame 4 there is a two armed lever 7, the ends of which are connected to the masses 1 and 2 respectively by means of rods 8, $8^1$. The connections 9 of the rods 8, $8^1$ to the masses 1, 2 are pivotal or yielding. The two armed lever 7 is disposed in parallel relationship to the suspending springs 3, while the rods 8, $8^1$ are disposed perpendicularly thereto. The rod 6 is conveniently connected to mass 1 in the vertical plane containing the common center of gravity of the two masses 1 and 2.

In the embodiment according to Fig. 2 the driving crankshaft $5^a$ is mounted in the mass $2^a$, which is constructed as a counterweight. In contrast to the conditions in the embodiment shown in Fig. 1, the masses $1^a$ and $2^a$ are supported by supporting elements $3^a$ on a base frame $4^a$. One of the rods $8^a$ is elastically connected to the two armed lever $7^a$ with the interposition of a spring 10. Evidently, the spring may be disposed at either end of the rod. It is also possible to connect both rods $8^a$ elastically with the masses $1^a$, $2^a$ or to the two armed lever $7^a$.

The embodiment shown in Fig. 3 differs from that shown in Fig. 2 in that the counterweight $2^b$ is suspended from the main mass $1^b$, constructed for example as a sifter frame, with the aid of the links $3^b$. The remaining parts are similar to the correspondingly numbered parts in Figs. 1 and 2 but with the suffix $b$.

What I claim as my invention and desire to secure by Letters Patent of the United States is:

1. An oscillatory device comprising in combination, two contrarily movable masses, a carrier frame therefor, parallel connecting means between said masses and said carrier frame, a crankshaft mounted on one of said masses, a connection between said crank shaft and the other of said masses, a two armed lever fulcrumed on the carrier frame in parallelism with the connecting means of said masses to said frame, and members substantially perpendicular to said connecting means, said members connecting the arms of the two armed levers with the masses respectively.

2. Oscillatory device according to claim 1, wherein the leverage ratio of the two armed lever is adjustable.

3. Oscillatory device according to claim 1 wherein the members connecting the two armed lever with the masses are elastically connected.

4. Oscillatory device according to claim 1, wherein the mass carrying the crank shaft is formed as a counterweight and is suspended from the other mass.

5. An oscillatory device comprising in combination, two contrarily movable masses, means on which said masses are supported, parallel connecting means interconnecting said first named means and said masses, a crank shaft mounted on one of said masses, a connection between said crank shaft and the other of said masses, a two armed lever fulcrumed on the first named means in parallelism with the connecting means of said masses to said first named means, and members substantially perpendicular to said connection means and connecting the arms of the two armed levers with the masses respectively.

JOSEPH WÖLZ.